United States Patent
Kaiser et al.

(10) Patent No.: US 8,711,462 B1
(45) Date of Patent: Apr. 29, 2014

(54) STROBOSCOPIC IMAGE MODULATION TO REDUCE THE VISUAL BLUR OF AN OBJECT BEING VIEWED BY AN OBSERVER EXPERIENCING VIBRATION

(75) Inventors: Mary K. Kaiser, Los Altos, CA (US); Bernard D. Adelstein, San Mateo, CA (US); Mark R. Anderson, San Carlos, CA (US); Brent R. Beutter, Los Altos, CA (US); Albert J. Ahumada, Jr., Mountain View, CA (US); Robert S. McCann, Mountain View, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 335 days.

(21) Appl. No.: 13/317,034

(22) Filed: Sep. 30, 2011

(51) Int. Cl.
*G02B 26/00* (2006.01)

(52) U.S. Cl.
USPC .......................................... 359/238; 359/900

(58) Field of Classification Search
USPC .................. 359/238, 227, 230, 234–236, 554
See application file for complete search history.

(56) References Cited

U.S. PATENT DOCUMENTS

| | | |
|---|---|---|
| 4,167,877 A | 9/1979 | Avery |
| 4,771,792 A | 9/1988 | Seale |
| 5,410,345 A | 4/1995 | Eichenlaub |
| 5,591,972 A | 1/1997 | Noble et al. |
| 6,256,457 B1 | 7/2001 | Miyamoto et al. |
| 6,856,356 B1 | 2/2005 | Kahn |
| 7,697,836 B2 | 4/2010 | Pozniansky et al. |
| 7,755,660 B2 | 7/2010 | Nejikovsky et al. |
| 2002/0044355 A1 * | 4/2002 | Klamer ........................ 359/554 |
| 2005/0243017 A1 | 11/2005 | Maruyama et al. |
| 2008/0062297 A1 | 3/2008 | Sako et al. |
| 2010/0079840 A1 | 4/2010 | Murtonen |

OTHER PUBLICATIONS

B.D. Adelstein, B.R. Beutter, M.K. Kaiser, R.S. McCann, M.R. Anderson, "Display Strobing Countermeasure Reduces Visual Impact of Whole-Body Vibration", Apr. 11-15, 2011, one page poster presentation at the International Academy of Astronautics 18th Humans in Space Symposium, Houston, TX.
Vibration Strobe Instruction Manual, Monarch Instrument, Monarch Instrument 2002, http://www.monarchinstrument.com/strobes_palm.htm.
Palm, Jon E., Strobe Light Applications for Machinery Problem Solving, Hardy Instruments, Technical Note based on an article that originally appeared in Sound & Vibration Magazine, Sep. 1992.

* cited by examiner

*Primary Examiner* — James Phan
(74) *Attorney, Agent, or Firm* — John F. Schipper; Christopher J. Menke; Robert M. Padilla

(57) ABSTRACT

A method and apparatus for reducing the visual blur of an object being viewed by an observer experiencing vibration. In various embodiments of the present invention, the visual blur is reduced through stroboscopic image modulation (SIM). A SIM device is operated in an alternating "on/off" temporal pattern according to a SIM drive signal (SDS) derived from the vibration being experienced by the observer. A SIM device (controlled by a SIM control system) operates according to the SDS serves to reduce visual blur by "freezing" (or reducing an image's motion to a slow drift) the visual image of the viewed object. In various embodiments, the SIM device is selected from the group consisting of illuminator(s), shutter(s), display control system(s), and combinations of the foregoing (including the use of multiple illuminators, shutters, and display control systems).

33 Claims, 6 Drawing Sheets

US 8,711,462 B1

STROBOSCOPIC IMAGE MODULATION TO REDUCE THE VISUAL BLUR OF AN OBJECT BEING VIEWED BY AN OBSERVER EXPERIENCING VIBRATION

ORIGIN OF INVENTION

The invention described herein was made in the performance of work under a NASA contract and by employees of the United States Government and is subject to the provisions 51 U.S.C. § 20135, and may be manufactured and used by or for the Government for governmental purposes without the payment of any royalties thereon or therefore.

CROSS-REFERENCE TO RELATED APPLICATIONS

Not Applicable

BACKGROUND OF THE INVENTION

1) Field of the Invention

The present invention relates generally to method and apparatus for reducing the visual blur of an object (particularly elements of a display) being viewed by an observer experiencing vibration. More particularly, stroboscopic image modulation is used to reduce the visual blur due to effects of the vibration.

2) Description of Related Art

When an object is experiencing vibration, an observer trying to focus on the object may see a blurred image of the object. This becomes particularly problematic when the perceived object is a display having text or characters that the observer needs to read or focus particular attention on. It is known in the art that illuminating an object (experiencing vibration) with a strobe light can decrease the perceived blur of the object for a stationary observer, if the light is strobed at or near the frequency (or integer factors [divisors] of) of the vibration.

U.S. Pat. No. 4,167,877 by Avery discloses the use of a strobe and accelerometer to analyze the resonant frequency(s) of a structure.

U.S. Pat. No. 5,591,972 by Noble et al, discloses strobing LED(s) at a predetermined frequency to read optical information from a distant object.

For situations where the observer is experiencing vibration and the object is stationary, or both the observer and object are experiencing vibration, the situation is more complex. When a vibrating object is viewed by a stationary observer, certain biological eye-movement mechanisms help the observer compensate for the shifting position of the viewed object. "Smooth pursuit" movements help to keep the image of a moving object on the foveal region of the retina. Saccadic eye movements help to rapidly shift the line of sight between successive points of fixation. When an observer is experiencing vibration, (in particular the observer's head), additional biological eye-movement mechanisms come into play. Vibration that cause rotation of the observer's head can trigger the vestibulo-ocular reflex, which in turn results in rotation of the eyes seeking to maintain an object's image on the foveal region of the retina. In addition the optokinetic reflex is triggered to assist the vestibulo-ocular reflex. If the object being viewed is shifting in position (near to far, or vice versa) due to relative motion between the observer and the viewed object, vergence eye movements (that coordinate rotations of the eyes for accurate binocular imaging) can come into play. For low temporal frequencies, all of these mechanisms help to mitigate the effects of observer vibration. However, these mechanisms are unable to accurately track higher temporal frequencies, and in fact can exacerbate the detrimental effects of vibration on human vision.

BRIEF SUMMARY OF THE INVENTION

An aspect of the present invention provides for reducing the visual blur of an object (particularly elements of a display) being viewed by an observer experiencing vibration ("observer vibration"). In various embodiments of the present invention, the visual image of an object viewed by the observer is stroboscopically modulated to reduce the visual blur of the viewed object. Stroboscopic image modulation (SIM) serves to reduce visual blur by "freezing" (or reducing to a slow drift) the viewed object's visual image. The SIM manner of operation comprises operating a device ("SIM device") in an alternating "on/off" temporal pattern (on/off states) according to a SIM drive signal (SDS) derived from the observer vibration. In various embodiments, the SDS comprises a pulsed signal with two-state logic (on/off) generated by the SIM control system. In various embodiments, the SIM control system generates the SDS that causes a SIM device (illuminator, shutter, display, and combinations of the foregoing [including the use of multiple illuminators, shutters, and displays]) to operate in the SIM manner. In various embodiments, the SIM control system is separate from the SIM device it is controlling. In various embodiments, the SIM control system is incorporated into the SIM device.

DETAILED DESCRIPTION OF THE INVENTION

Acronyms

Figure 1A:
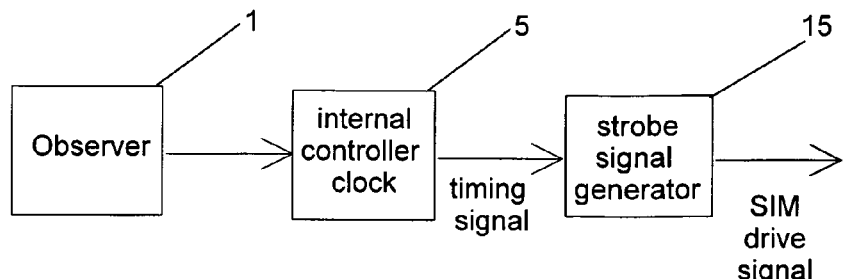
FIGS. 1A-1D illustrate various aspects of embodiments of a SIM control system with respect to measurement and analysis of the observer vibration, and generation of a "stroboscopic image modulator" (SIM) drive signal. In the figures, like or similar elements (such as strobe signal generator 15) utilize the same reference characters throughout the various views.

DSP Digital Signal Processor
$DC_{sim}$ SIM duty cycle—percentage of time that the SIM device is "on" during one cycle of the SDS frequency period ($1/F_{sds}$), expressed as a proportion (e.g., 35%) of a vibration cycle, in embodiments where the SDS is characterized by an SDS frequency $F_{sds}$ DISAB$_{sim}$ SIM device "disabled" mode—mode wherein the SIM device is not operating in any "enabled" modes (i.e., no stroboscopic image modulation).

EMG Electromyography

ENAB$_{sim}$ SIM device "enabled" mode—mode wherein the SIM device is operating in one of various modes:
  a) constant firing mode (SDS characterized by $F_{sds}$); b) episodic firing mode;
  c) automatic mode (ability to switch between constant firing and episodic firing modes)

EOG Electrooculography

FPGA Field Programmable Gate Array

FFT Fast Fourier Transform $F_{objv}$ Viewed object vibration frequency—frequency selected as representative of the viewed object vibration, where the viewed object's vibration is deterministic $F_{objvd}$ Viewed object vibration frequency/dominant—dominant frequency (e.g., sinusoidal component with the largest amplitude) selected from a frequency range of interest, where the viewed object vibration is deterministic and characterized by a composite of multiple sinusoids with different frequencies $F_{objvs}$ Viewed object vibration frequency/single—where the viewed object vibration is deterministic and characterized by a single sinusoid at this frequency $F_{ov}$ Observer vibration frequency—frequency selected as representative of the observer's vibration, where the observer's vibration is deterministic $F_{ovd}$ Observer vibration frequency/dominant—dominant frequency (e.g., sinusoidal component with the largest amplitude) selected from a frequency range of interest, where the observer vibration is deterministic and characterized by a composite of multiple sinusoids with different frequencies $F_{ovs}$ Observer vibration frequency/single—where the observer vibration is deterministic and characterized by a single sinusoid at this frequency $F_{sds}$ SIM drive signal frequency—in various embodiments, a frequency characterizing the SDS, wherein the frequency is derived from the observer vibration (or combinations of observer vibration and viewed object vibration)

OTM$_{sim}$ SIM onset trigger mechanism—the trigger mechanism that initiates an individual SDS "on" pulse IC integrated circuit rms root mean square SDS SIM drive signal—signal according to which a SIM device is driven in an alternating on/off temporal pattern. In various embodiments, the SDS is derived from the observer vibration (or combinations of observer vibration and viewed object vibration)

SIM stroboscopic image modulation—a SIM control system causes a SIM device to operate in an alternating on/off temporal pattern according to a SIM drive signal to reduce the visual blur of the image of an object being viewed by an observer experiencing vibration.

SIM$_{ds}$ SIM display shutter—SIM object shutter wherein the object being viewed is a display SIM$_{disp}$ SIM display—SIM device comprising a display controlled by a SIM control system SIM$_{os}$ SIM object shutter—SIM device comprising a shutter interposed between the observer and an object being viewed by the observer SIM$_{il}$ SIM illuminator—SIM device comprising an illuminator that illuminates the object being viewed SIM$_{ls}$ SIM light shutter—SIM device comprising a shutter interposed between a non-SIM illuminator (illuminating the viewed object) and the viewed object SP$_{sim}$ SIM synchronizing parameter—parameter synchronizing the start of a SIM control system's "on" pulse with the observer's vibration, expressed as a SIM temporal delay SPI SDS parameter information—information for SDS parameters (characterizing the SDS) determined from VFI for a given vibration (observer or viewed object), wherein the SDS parameters are selected from the group consisting of: frequency, duty cycle, SIM synchronizing parameter, "on" time duration, SIM onset trigger mechanism, SIM shutoff trigger mechanism, "on" pulse time duration, SIM temporal delay, and combinations of the foregoing;

SSP Strobe synchronization processing

STM$_{sim}$ SIM shutoff trigger mechanism—the trigger mechanism that terminates an individual SDS "on" pulse $T_{on}$ "On" time duration—value of time from which the SIM duty cycle is calculated $DC_{sim}=T_{on}*F_{sds}$ for embodiments where the SDS is deterministic with frequency, $F_{sds}$ $T_p$ "On" pulse time duration—width (duration of time) for a given SDS "on" pulse. For a periodic SIM drive signal, $T_p$ is constant. For a periodic SIM drive signal with frequency, $F_{sds}$, $T_p$ is equivalent to $T_{on}$. For other SIM drive signals, $T_p$ may be variable.

TD$_{sim}$ SIM temporal delay—time interval between the trigger point in the observer vibration signal and a SIM device's "on" pulse (measured from the beginning, center, or end of the pulse).

VFI vibration feature information—information for vibration features extracted from VQI for a given vibration (observer or viewed object), wherein the vibration features include, but are not limited to: frequency, amplitude, phase, zero-crossings, local extrema (local minima or maxima), and combinations of the foregoing VQI vibration quantifier information—information for vibration quantifiers for a given vibration (observer or viewed object), wherein the vibration quantifiers include: acceleration, velocity, displacement, EMG, EOG, and combinations of the foregoing, Aspects of the present invention disclose reducing the visual blur of an object being viewed (particularly the elements of a display) for an observer experiencing vibration ("observer vibration") while viewing the object. In various embodiments of the present invention, the visual image of an object viewed by the observer is stroboscopically modulated to reduce the visual blur of the viewed object. Stroboscopic image modulation serves to reduce visual blur by "freezing" (or reducing to a slow drift) the viewed object's visual image. This SIM manner of operation comprises operating a device ("SIM device") in an alternating "on/off" temporal pattern (on/off states) according to a SIM drive signal (SDS) generated by a SIM control system. In various embodiments, the SDS is derived from the observer vibration. In various embodiments, the SDS is derived from a combination of the observer vibration and viewed object vibration. In various embodiments, the SDS comprises a pulsed signal with two-state logic (on/off). Since the SIM control system operates a SIM device in an alternating on/off temporal pattern by an SDS on/off pulse(s), a SIM device "on" pulse is to be understood as having equivalent meaning as the SDS "on" pulse, as well as a SIM device "cycle" having equivalent meaning as an SDS "cycle". Similarly, a SIM control system's "on" pulse and cycle are to be understood as having equivalent meanings as the SDS "on" pulse and cycle. In various embodiments, an SDS derived from the observer vibration comprises an SDS generated from one or more SDS parameters that have been determined from information about the observer vibration (e.g., vibration quantifier information [VQI] and vibration feature information [VFI]). In various embodiments, an SDS derived from the observer vibration comprises an SDS generated from one or more SDS parameters that have been determined from observer VQI/VFI and viewed object VQI/VFI.

In various embodiments, the SIM control system, causes a device ("SIM device"), for example, such as illuminator(s), shutter(s), display control system(s), and combinations of the foregoing (including the use of multiple illuminators, shutters, and display control systems), to operate in the SIM manner. In various embodiments, the SIM control system is separate from the SIM device it is controlling. In various embodiments, the SIM control system is incorporated into the SIM device. In various embodiments, the SDS (generated by the SIM control system) causes a SIM device to operate in alternating "on/off" states. In various embodiments, a SIM illuminator ($SIM_{il}$), operating according to an SDS, provides light to the viewed object when in the "on" state and no light in the "off" state. In various embodiments, a SIM object shutter ($SIM_{os}$), operating according to an SDS, is interposed between the observer and the object being viewed. In the "on" state, the $SIM_{os}$ allows the observer to view the object, and prevents the observer from viewing the object in the "off" state. In various embodiments, the viewed object is a display, and the SIM object shutter comprises a SIM display shutter ($SIM_{ds}$). In various embodiments, a SIM light shutter ($SIM_{ls}$), operating according to an SDS, is interposed between the viewed object and a non-SIM illuminator (i.e., an illuminator that is "continuously on" and not under the control of the SIM) providing light to the viewed object. In the "on" state, the SIM light shutter allows light from the non-SIM illuminator to illuminate the viewed object, and prevents light from the non-SIM illuminator from illuminating the viewed object in the "off" state. In various embodiments, a SIM display control system ($SIM_{dcs}$), controlling a display to operate according to an SDS, directs at least a portion of the display to display an image when in the "on" state, and directs that portion of the display to a uniform blank image when in the "off" state. In various embodiments, in the "off" state, the uniform blank image is matched to various aspects of the "on" display image (e.g., background, average luminance, etc.).

In various embodiments, the object being viewed by the observer includes (but not limited to): a) printed material; b) text/graphics/markings on or near instruments, switches, controls, dials, signs, and placards; c) displays; and d) combinations of the foregoing. In various embodiments, the display (or portion thereof) may comprise: mechanical displays (including but not limited to mechanical gauges and dials); electromechanical displays (including but not limited to electromechanical gauges and dials); electronic displays (including but not limited to LCD displays, LED displays, OLED displays, plasma displays, CRT displays, electroluminescent displays, electronic paper displays); or combinations of the foregoing. In various embodiments, the "front" of the viewed object (of which a display may comprise a subset or the entirety) is the surface of the viewed object that faces the observer, and the "back" of the viewed object is the surface of the viewed object that faces away from observer (i.e., the surface opposite from the "front" surface).

In various embodiments, information for one or more observer vibration quantifiers is determined, wherein said observer vibration quantifier(s) include: acceleration, velocity, displacement, Electromyography (EMG), Electrooculography (EOG), and combinations of the foregoing. Vibration quantifier information (VQI) include: i) previously determined VQI; ii) currently determined VQI; and iii) combinations of the foregoing. In various embodiments, previously determined VQI include, for example: a) previous VQI measurements, for an environment similar to the one being experienced or expected to be experienced by said observer; b) previous VQI from estimation algorithms, for an environment similar to the one being experienced or expected to be experienced by said observer; c) combinations of the foregoing. In various embodiments, currently determined VQI includes: a) VQI from estimation algorithms during observer vibration; b) VQI measured in real-time by transducer(s) during observer vibration; and c) combinations of the foregoing. Previously determined VQI may be available in various forms including but not limited to: a) printed hardcopy; b) stored on computer or electronic medium; c) personal knowledge of the observer or a third party; or d) combinations of the foregoing. In various embodiments, VQI from estimation algorithms comprises output from analyses using engineering models and existing data. In various embodiments, estimation algorithms are implemented on computer hardware/software. In various embodiments, EOG measurements are used to quantify observer eye movements responding to experienced observer vibration. In various embodiments, EMG measurements are used to quantify observer muscle contractions responding to experienced observer vibration. In various embodiments, model(s) of individual observer vibration sensitivity to vibration provide(s) features or parameters for strobe synchronization processing. Such a model would predict retinal image motion (or perceived blur) for the individual observer that would result from the measured whole-body vibration input. The model would include the biological elements governing oculomotor response such as eye-head-neck biodynamics and vestibulo-ocular reflex gain factors. The strobe's frequency, duty cycle, and phasing would be set to levels that the model predicts will minimize retinal image motion (or perceived blur). In various embodiments, when the viewed object is also experiencing vibration, viewed object VQI (for quantifiers: acceleration, velocity, displacement) may be determined in the same manner as described earlier in this paragraph for observer VQI (for quantifiers: acceleration, velocity, displacement).

In various embodiments, information is determined for one or more vibration feature(s) including: frequency, amplitude, phase, zero-crossings, local extrema (local minima or maxima), and combinations of the foregoing. Vibration features may be extracted e.g., by: 1) comparators [analog or digital], implemented in electronic circuit(s), Field Programmable Gate Array(s) (FPGAs), microcontroller(s), digital signal processor(s) [DSPs], computer hardware/software, or combination of the foregoing; 2) signal analysis methods such as (but not limited to) Fourier analysis, wavelet analysis, etc., via microcontrollers, DSPs, computer hardware/software or combinations of the foregoing suitable for signal analysis; or 3) combinations of the foregoing. In various embodiments, Fourier analysis is utilized for vibration feature extraction. Fast Fourier Transforms (FFTs) are computed repeatedly on continuously updated vibration quantifier(s) measurement(s) as provided by an accelerometer (or other transducer). Each FFT reveals amplitude of the dominant sinusoidal component for complex (deterministic or random) waveforms over the frequency range of interest. In addition to the amplitude of each sinusoidal component, the FFT also provide phase angle information (i.e., baseline delay) associated with each sinusoidal component. The total delay (either in terms of time or phase angle) for the dominant sinusoidal component may be increased by adding to the baseline phase. Since the FFT reveals the vibration's dominant frequency, the duration of "on" pulses can be controlled in terms of duty cycle (i.e., the fraction or percentage of SIM drive signal cycle period, $1/F_{sds}$) or directly as a time duration. In various embodiments, observer VFI is determined from VFI that include: i) previously determined VFI (VFI extracted from previously determined VQI; ii) currently determined VFI (VFI extracted from currently determined VQI); and iii) combinations of the foregoing. Previously determined VFI may be available in various forms including but not limited to: a) printed hardcopy; b) stored on computer or electronic medium; c) personal knowledge of the observer or a third party; or d) combinations of the foregoing. In various embodiments, VFI for the viewed object (when the viewed object is experiencing vibration) may be determined in the same manner as described earlier in this paragraph for observer VFI.

In various embodiments, information is determined for one or more SDS parameters from observer VFI (or observer VFI and viewed object VFI). SDS parameters include: frequency; duty cycle; SIM synchronizing parameter; "on" time duration; SIM onset trigger mechanism; SIM shutoff trigger mechanism; "on" pulse time duration; SIM temporal delay; and combinations of the foregoing. In various embodiments, determination of SDS parameter information (SPI) comprises: a) strobe synchronization processing of VFI with apparatus including electronic circuits, microcontrollers, DSPs, computer hardware/software, and combination of the foregoing; b) manual entry of SPI by the observer (or a third party); c) utilization of previously determined SPI, and d) combinations of the foregoing. Enabling manual entry (prior to vibration, during vibration, or both) of SPI by the observer (or a third party) allows for the perceived image quality to be optimized as desired. Manual entry apparatus may include but are not limited to: manual controls, voice controls, and combinations of the foregoing. Computer hardware/software may be utilized to analyze VFI in order to determine SDS parameter(s) as desired. In various embodiments, when the viewed object is also experiencing vibration, strobe synchronization processing uses a combination of observer VFI and viewed object VFI. SPI is used in the generation of an SDS by a strobe signal generator. In various embodiments, SPI may include: i) previously determined SPI (using previously determined VFI); ii) currently determined SPI (using currently determined VFI); and iii) combinations of the foregoing. Previously determined SPI may be available in various forms including but not limited to: a) printed hardcopy; b) stored on computer or electronic medium; c) personal knowledge of the observer or a third party; or d) combinations of the foregoing. In various embodiments, computer hardware/software may be utilized to coordinate the various types of SPI (e.g., previously determined SPI that would need to be retrieved from storage [computer media, electronic media], SPI determined from VFI, SPI entered by the observer [or third party]).

In various embodiments, real-time measurement(s) of one or more observer vibration quantifier(s) is (are) taken by transducer(s) at a location (or locations) include, but are not limited to: the observer's head; at or near the observer's eye(s); other location(s) on the observer's person, a structure supporting the observer (e.g., a chair on which the observer is sitting or structure on which the observer is standing); and combinations of the foregoing. In various embodiments, real-time measurement(s) of one or more viewed object vibration quantifier(s) is (are) taken by transducer(s) at or near the viewed object location. In various embodiments, vibration (observer, viewed object) quantifier(s) include amplitude, velocity, displacement, and combinations of the foregoing, is measured in up to six spatial (three rectilinear and three rotational) degrees-of-freedom. In various' embodiments, real-time EMG measurement(s) is (are) taken by transducer(s) at locations on the observer's head, neck, or torso. In various embodiments, real-time EOG measurement(s) is (are) taken.

In various embodiments, the observer vibration is deterministic and characterized by a single sinusoid with frequency, $F_{ovs}$, wherein observer vibration frequency $F_{ov}=F_{ovs}$. In various embodiments, the observer vibration is deterministic and characterized by a composite of multiple sinusoids, wherein $F_{ov}$ is set equal to the frequency, $F_{ovd}$, of the dominant sinusoidal component (e.g., sinusoidal component with the largest amplitude), in the frequency range of interest. In various embodiments, $F_{ov}$ is a vibration feature extracted from the observer vibration quantifier information.

In various embodiments, the viewed object vibration is deterministic, and characterized by a single sinusoid with frequency, $F_{objvs}$, wherein the viewed object vibration frequency $F_{objv}=F_{objvs}$. In various embodiments, the viewed object vibration is deterministic and characterized by a composite of multiple sinusoids, wherein $F_{objv}$ is set equal to the frequency, $F_{objvd}$, of the dominant sinusoidal component (e.g., sinusoidal component with the largest amplitude), in the frequency range of interest. In various embodiments, $F_{objv}$ is a vibration feature extracted from the viewed object vibration quantifier information.

In various embodiments, the observer vibration is deterministic and the SDS is characterized by SIM frequency $F_{sds}$ derived from $F_{ov}$. In various embodiments, $F_{sds}$ is set equal to $F_{ov}$. In various embodiments, $F_{sds}$ is determined by setting $F_{sds}=F_{ov}/n$, where n is an integer factor (divisor) of $F_{ov}$. In various embodiments, where $F_{ov}=F_{ovd}$, then $F_{sds}$ is set to a frequency within ±X Hz of $F_{ov}$, with X typically less than 3 Hz. Where the observer vibration is deterministic and $F_{ov}=F_{ovd}$, then setting $F_{sds}$ to be a frequency within ±X Hz of $F_{ov}$ may not "freeze" the image (as would be the case if $F_{sds}=F_{ov}=F_{ovs}$), but would result in the viewed object's visual image perceived by the observer to "drift" slowly enough such that the image can be visually tracked, thereby still reducing blur of the visual image perceived by the observer. In various embodiments, one or more parameters including $F_{sds}$, integer factor n, and X are under the control of the observer (or a third party) who can adjust the parameter(s) to optimize the perceived image quality of the viewed object as desired.

In various embodiments, $F_{sds}$ is determined by setting $F_{sds}$ to the greatest (or other) common factor of $F_{ov}$ and $F_{objv}$. For example, if $F_{ov}$ is 12 Hz and $F_{objv}$ is 16 Hz, then $F_{sds}$ would be set to 4 Hz. Where there is no exact common integer factor of $F_{ov}$ and $F_{objv}$, $F_{sds}$ is set to a frequency such as $F_{ov}$, $F_{objv}$, and a frequency within ±X Hz of either $F_{ov}$ or $F_{objv}$. The range ±X provides a frequency range that results in acceptably slow "drift" of the viewed object's image providing reduced blur of the visual image perceived by the observer. The value of X may be specified ahead of time (prior to vibration onset) or manually controlled by the observer (such as during vibration to allow finer tuning). In various embodiments, X is less than 3 Hz. In various embodiments, one or more parameters including $F_{sds}$, greatest (or other) common factor of $F_{ov}$ and $F_{objv}$, and X, are under the control of the observer (or a third party) who can adjust the parameter(s) to optimize the perceived image quality of the viewed object as desired.

In various embodiments where the SDS is characterized by SDS frequency $F_{sds}$, SDS is further characterized by a parameter including such as: a) SIM duty cycle $DC_{sim}$; b) SIM synchronizing parameter $SP_{sim}$; c) SIM "on" time duration $T_{on}$; d) SIM temporal delay $TD_{sim}$; and e) combinations of the foregoing. In various embodiments, the observer (or a third party) may adjust one or more SDS parameter(s) to optimize the perceived image quality of the viewed object as desired, wherein the SDS parameter includes $F_{sds}$, $DC_{sim}$, $SP_{sim}$, $T_{on}$, $TD_{sim}$, and combinations of the foregoing.

In various embodiments where the SDS is characterized by SDS frequency, $F_{sds}$, SIM duty cycle $DC_{sim}$ is the percentage of time (e.g., 35% of an SDS cycle) during each period of the SDS cycle (period=$1/F_{sds}$) that the SIM device is "on", i.e., when a SIM illuminator is providing light, a SIM light shutter or SIM object shutter is open, or a display is displaying a visual image according to a SIM display control system. Since the duty cycle affects the perceived brightness of the visual image (thereby also affecting legibility), in various embodiments, the observer (or a third party) can manually vary $DC_{sim}$ (or increase the brightness for embodiments where the SIM device is a SIM illuminator or a SIM display). In various embodiments, $DC_{sim}$ is pre-set to a specific value before onset of vibration. In various embodiments, $DC_{sim}$ is specified by the observer (or a third party) either prior to onset of vibration or during vibration. In various embodiments, a specific duration of time, $T_{on}$, is specified (e.g., 40 milliseconds) that the SIM device is "on" during each SDS cycle. The duty cycle $DC_{sim}$ may be calculated as $DC_{sim}=T_{on}*F_{sds}$.

In various embodiments the SDS is characterized by SDS frequency, $F_{sds}$. In various embodiments where the SIM device comprises a SIM illuminator, the SIM illuminator can be increased in brightness to compensate for the reduced average luminance resulting from the period of time during an SDS cycle when the SIM device is not providing light. In various embodiments where the SIM device comprises a SIM light shutter, the non-SIM illuminator may be increased in brightness to compensate for the reduced average luminance resulting from the period of time during an SDS cycle when the SIM light shutter is blocking light from the non-SIM illuminator. In various embodiments where the SIM device comprises a SIM object shutter and the viewed object comprises a display, the display's image may be increased in brightness to compensate for the reduced average luminance resulting from the period of time during an SDS cycle when the SIM object shutter is blocking viewing of the display. In various embodiments where the SIM device comprises a SIM display, the display's image may be increased in brightness to compensate for the reduced average luminance resulting from the period of time during an SDS cycle when the display is not displaying an image.

SIM synchronizing parameter $SP_{sim}$ comprises how the start of the SIM control system's "on" pulse is synchronized with the observer vibration. In various embodiments, $SP_{sim}$ comprises a temporal delay $TD_{sim}$ (time interval between onset of an observer vibration pulse and the SIM control system's "on" pulse). For deterministic observer vibration, $TD_{sim}$ can be represented by a phase angle difference between the observer vibration and the SIM device (driven according to the SDS). $TD_{sim}$ may be set or measured (as desired) relative to the start, middle, or end of the SIM's "on" pulse. In various embodiments, $TD_{sim}$ is set (manually or automatically) prior to onset of observer vibration, during observer vibration, or both.

In various embodiments, the SIM control system operates a SIM device with a SIM onset trigger mechanism, $OTM_{sim}$, that initiates an individual SDS "on" pulse. In various embodiments, the $OTM_{sim}$ includes: a) the absolute value or root mean square (rms) of the amplitude of an observer vibration quantifier being greater than a specified threshold, wherein the quantifier includes: a) acceleration, velocity, displacement, EMG, EOG, and combinations of the foregoing; b) occurrence of zero-crossing(s) in an observer vibration quantifier (as determined, for example, by a threshold crossing carried out by a digital algorithm or comparator threshold crossing by an analog circuit), wherein the quantifier includes displacement, velocity, acceleration, EOG, EMG, and combinations of the foregoing; c) occurrence of local extrema (local minima or maxima) in an observer vibration quantifier as determined, for example, by sign changes in the first derivative with respect to time of the quantifier, wherein the quantifier is includes displacement, velocity, acceleration, EOG, EMG, and combinations of the foregoing; and d) combinations of the foregoing. In various embodiments, $OTM_{sim}$ further comprises a lockout mechanism to prevent spurious re-triggering of SIM device initiation during an SDS period due to noisy measurements (of observer vibration quantifiers). In various embodiments, the lockout mechanism comprises a low-pass filter. In further embodiments, the lockout mechanism comprises a non-retriggerable flip-flop logic element that prevents the $OTM_{sim}$ from reset for a fixed-time duration (such as during an SDS "on" pulse period). In various embodiments, $OTM_{sim}$ is under the control of the observer (or a third party) who can adjust the $OTM_{sim}$ to optimize the perceived image quality of the viewed object as desired.

In various embodiments, the SIM is operated with a SIM shutoff trigger mechanism $STM_{sim}$, wherein $STM_{sim}$ comprises the trigger mechanism that terminates an individual SIM "on" pulse. In various embodiments, the $STM_{sim}$ comprises the absolute value or root mean square (rms) of the amplitude of an observer vibration quantifier being less than a specified threshold, wherein the quantifier includes: acceleration, velocity, displacement, EOG, EMG, and combinations of the foregoing. In various embodiments, an "on" pulse time duration $T_p$ is specified. In various embodiments, $T_p$ is determined by an action including: a) assignment of a value of $T_p$ that is known empirically to reduce visual image blur for the observer vibration (expected or actual); b) calculation of the maximum rate of change of an observer vibration quantifier (including displacement, velocity, acceleration, EOG, EMG, and combinations of the foregoing), which, when divided by a specified amount of change of said vibration quantifier, yields a value of $T_p$; and c) combinations of the foregoing. In various embodiments, $STM_{sim}$ (and/or $T_p$) is under the control of the observer (or a third party) who can adjust the $STM_{sim}$ (and/or $T_p$) to optimize the perceived image quality of the viewed object as desired.

In various embodiments, the SIM control system (through appropriate computer hardware/software, electronic components, or combination of the foregoing) controls the SDS signal in order to operate a SIM device in various "enabled" operating modes ($ENAB_{sim}$) include: a) constant firing mode (SDS characterized by $F_{sds}$); b) episodic firing mode; and c) automatic mode (ability to switch between constant firing and episodic firing modes). In various embodiments, in the SIM device "disabled" mode, the SIM device is not operating in an "enabled" mode (i.e., no stroboscopic image modulation). In various embodiments, a SIM device in disabled mode including: a) a SIM illuminator that is always on or always off; b) a SIM light shutter that is always open (allowing light from a non-SIM illuminator to reach the viewed object); c) a SIM object shutter that is always open (allowing the observer to view the viewed object); and d) a SIM display where the SIM control system does not stroboscopically modulate the display image. In various embodiments, the observer (or a third party) can switch between the enabled and disabled modes as desired.

In the constant firing mode (SDS characterized by $F_{sds}$ for deterministic, periodic observer vibration), the SIM device operates in a continuous alternating on/off temporal pattern until the SIM is switched to the SIM disabled mode by action including: manual operation; by timer; $STM_{sim}$ threshold reached; and combinations of the foregoing. In various embodiments, the constant firing mode is initiated by action including: manual operation; by timer; $OTM_{sim}$; and combinations of the foregoing.

In the episodic firing mode, SDS "on" pulses are generated according to $OTM_{sim}$ and $STM_{sim}$ (or $T_p$) thresholds being met based on features from measured observer vibration information. In various embodiments, the episodic firing mode is initiated by action including: manual operation; by timer; and combinations of the foregoing. In the episodic firing mode, the general assumption is that the observer vibration is random. However, operation of a SIM in the episodic firing mode with a deterministic observer vibration would result in similar behavior as in the constant firing mode (albeit the SIM constantly needing to measure observer vibration, and perform signal analysis to derive appropriate "on" pulse information). The episodic firing mode is terminated (switched to SIM disabled mode) by action including: manual operation, by timer, automatic operation based on detection of observer vibration below a threshold, and combinations of the foregoing.

In the automatic firing mode, the SIM device begins operation in either the constant firing or episodic firing mode. Computations based on the observer vibration may be used to automatically switch the SIM device operating mode. For example, with the SIM device initially operating in constant firing mode (deterministic observer vibration), if it is detected that the observer vibration is random rather than deterministic (e.g., initial assumption of deterministic vibration is in error, or vibration behavior changes) then the SIM control system automatically switches the SIM device to episodic firing mode. Similarly, with the SIM device initially operating in episodic firing mode, if it detected that the observer vibration is deterministic then the SIM control system automatically switches the SIM device to constant firing mode. Automatic switching between SIM device operating modes may be implemented via the SIM control system changing the SDS signal (changing the SPI provided to the strobe signal generator depending on the observer vibration exhibiting random or deterministic behavior). The automatic firing mode is terminated (switched to SIM device disabled mode) by action including: manual operation, by timer, automatic operation based on detection of observer vibration below a threshold, and combinations of the foregoing.

In various embodiments, observer vibration is experienced by a person in space flight (including but not limited to launch or entry, planetary/lunar orbit departure). In various embodiments, observer vibration is one experienced by a person onboard an aircraft (military or commercial, including but not limited to fixed-wing and rotorcraft). In various embodiments, the observer vibration is one experienced by a person in a land vehicle (including but not limited to off-road vehicles, or vehicles moving at high speed such as emergency vehicles or racing vehicles). In various embodiments, observer vibration is experienced by a person onboard a water-borne vehicle, particularly those experiencing high vibration due to high speed, (including but not limited to amphibious landing craft). In various embodiments, observer vibration is experienced by a person on military, industrial or agricultural machinery. In various embodiments, observer vibration is experienced by a person utilizing handheld/portable computing and/or communication devices (e.g., smartphones, laptops/netbooks, iPads and other tablets, e-book readers).

In various embodiments, the SIM control system is a stand-alone apparatus (separate from the illuminator(s); shutter(s), display(s) it is controlling). In various embodiments, the SIM control system is incorporated into the device ("SIM device") it is controlling (e.g., illuminator(s), shutter(s), display(s)). The SIM control system comprises a system of one or more components including mechanical, electric, electronic, electro-mechanical, software components, and combinations of the foregoing configured to direct a SIM device (illuminator(s), shutter(s), display(s), combinations of the foregoing) to operate in an alternating on/off temporal pattern according to the SDS. In various embodiments, the SIM control system incorporates the strobe signal generator that generates the SIM drive signal using SDS parameter information (SPI). In various embodiments, the SIM control system incorporates the transducer(s) that measure(s) vibration quantifier information (VQI). In various embodiments, the transducer(s) is (are) separate from the SIM control system. In various embodiments, the SIM control system incorporates the apparatus (hardware, software, combination of the foregoing) for extracting vibration feature information (VFI) from the vibration (observer, observer and viewed object). In various embodiments the VFI extraction apparatus is separate from the SIM control system. In various embodiments, the SIM control system incorporates the strobe synchronization processing (SSP) apparatus (hardware, software, combination of the foregoing) that determines SPI from VFI. In various embodiments the strobe synchronization processing apparatus is separate from the SIM control system. In various embodiments, the SIM control system incorporates storage media (including computer medium, electronic medium, printed hardcopy, and combinations of the foregoing), to store SPI, VFI, VQI, and combinations of the foregoing. In various embodiments where the SIM control system is not incorporated with the SIM device it is controlling, the SIM control system incorporates the appropriate interface apparatus (hardware, software, combinations of the foregoing) for communication of the SDS between the SIM control system and the SIM device. In various embodiments, the SDS is transmitted from the SIM control system to the SIM device by a wired connection. In various embodiments, the SDS is transmitted from the SIM control system to the SIM device by a wireless connection.

In various embodiments, the viewed object is a display, and a SIM illuminator ($SIM_{il}$) provides light to a surface of the display. In various embodiments, where the $SIM_{il}$ provides light to the front of the display, the display including: mechanical displays (including but not limited to mechanical gauges/dials); printed text/graphics displays (including but not limited to panel labels, control markings or labels); electromechanical displays (including but not limited to electro-mechanical gauges/dials); electronic paper displays; and combinations of the foregoing. In various embodiments, the $SIM_{il}$ is an apparatus separate from the display. In various embodiments, the $SIM_{il}$ is incorporated into the display.

In various embodiments, the viewed object is a display, and a SIM illuminator provides light to a surface of the display. In various embodiments, where the $SIM_{il}$ provides light to the back of the display, the display including: mechanical gauges/dials; LCD displays; and combinations of the foregoing. In various embodiments, the $SIM_{il}$ is an apparatus separate from the display. In various embodiments, the $SIM_{il}$ is incorporated into the display.

In various embodiments, the SIM device comprises a SIM object shutter ($SIM_{os}$) interposed between the observer and the object being viewed by the observer. In various embodiments, the $SIM_{os}$ including mechanical shutters, chemical shutters (e.g., photochromic), electro-optical shutters (e.g., electrochromic), liquid crystal display (LCD) based shutters, mirror-based shutters, polarizers, and combinations of the foregoing. In various embodiments, the $SIM_{os}$ is an apparatus separate from the viewed object. In various embodiments, the $SIM_{os}$ is incorporated into the viewed object. In various embodiments, the $SIM_{os}$ is incorporated into apparatus (including but not limited to goggles, spectacles, headset) worn by the observer. In various embodiments, the SIM comprises a SIM display shutter ($SIM_{os}$) and the viewed object comprises a display including, for example: electromechanical displays; electronic displays (including but not limited to LCD displays, LED displays [including OLED displays], plasma displays, CRT displays, electroluminescent displays, electronic paper displays); and combinations of the foregoing.

In various embodiments, the SIM device comprises a SIM light shutter ($SIM_{ls}$) interposed between the object being viewed and a non-SIM illuminator (one that is not operating in a SIM manner, i.e., constantly "on") illuminating the viewed object. In various embodiments, the $SIM_{ls}$ including mechanical shutters, chemical shutters (e.g., photochromic), electro-optical shutters (e.g., electrochromic), liquid crystal display (LCD) based shutters, mirror-based shutters, polarizers, and combinations of the foregoing. In various embodiments, the viewed object comprises a display, and said non-SIM illuminator provides light to a surface of said display. In various embodiments wherein the non-SIM illuminator is providing light to the front of the display, the display including displays such as: mechanical displays (including but not limited to mechanical gauges/dials); printed text/graphics displays (including but not limited to panel labels, control markings or labels); electromechanical displays (including but not limited to electromechanical gauges/dials); electronic paper displays; and combinations of the foregoing. In various embodiments where the non-SIM illuminator is providing light to the back of the display, the display including displays such as: mechanical gauges/dials; LCD displays; and combinations of the foregoing. In various embodiments, the $SIM_{ls}$ is an apparatus separate from the non-SIM illuminator. In various embodiments, the SIM light shutter is incorporated into the non-SIM illuminator. In various embodiments, the $SIM_{ls}$ is incorporated into apparatus (including but not limited to goggles, spectacles or a headset) worn by the observer.

In various embodiments, the viewed object comprises a display ($SIM_{disp}$) controlled by a SIM control system. The display includes: electromechanical displays; electronic displays (including but not limited to LCD displays, LED displays [including OLED displays], plasma displays, CRT displays, electroluminescent displays, electronic paper displays); and combinations of the foregoing. In various embodiments, the SIM control system stroboscopically modulates only a portion of the display (i.e., only selected parts of the display are redrawn) during an SDS "on/off" pulse. In various embodiments, the entire display is stroboscopically modulated during an SDS "on/off" pulse. In various embodiments, the SIM control system is separate from the $SIM_{disp}$. In various embodiments, the SIM control system is incorporated into the $SIM_{disp}$.

In various embodiments, the light (visible spectrum) from the SIM illuminator includes: a) laser light; b) non-laser light; c) polarized light; d) non-polarized light; and e) lens-focused light.

In various embodiments, one or more SIM devices (illuminator, shutter, or combinations of the foregoing) are incorporated into displays. In various embodiments, one or more SIM devices (illuminator to illuminate an object being viewed, shutter, or combinations of the foregoing) are incorporated into gear (e.g., spectacles, goggles, headset), worn by the observer. In various embodiments, one or more SIM devices (illuminator, shutter, or combinations of the foregoing), are incorporated into head-mounted displays (HMDs).

Various aspects of exemplary SIM control system embodiments are described hereunder with reference to FIG. 1A. Referring to FIG. 1A, an internal controller clock (in some embodiments, under the high-level control of the observer 1) provides a timing signal 5 which is used by strobe signal generator 15 for generating a SIM drive signal (SDS). Use of a timing signal 5 would be for embodiments where SDS parameter(s) (e.g., $F_{ov}$) are already known and not determined from real-time measurements of vibration quantifiers. In various embodiments where a timing signal is used, the SDS parameter(s) may be known from previous experience, determined from estimation algorithms for the vibration environments expected to be experienced by the observer, or combinations of the foregoing.

Figure 1B:
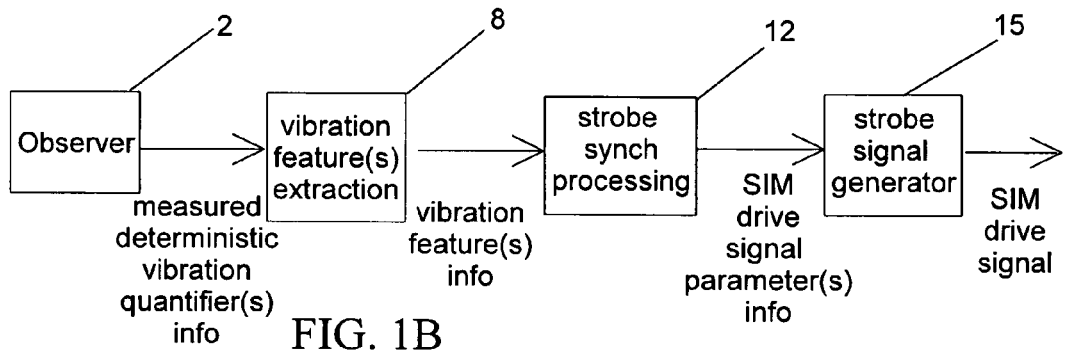

Various aspects of exemplary SIM control system embodiments are described hereunder with reference to FIG. 1B. Referring to FIG. 1B, various embodiments are illustrated where the observer vibration 2 is deterministic and the SDS is derived from real-time measurements of one or more observer vibration quantifier(s). In various embodiments, transducers are used for measurement of observer vibration quantifier(s). One or more vibration features are extracted 8 [e.g., by: 1) analog or digital comparators implemented in electronic circuit(s), FPGAs, microcontroller(s), DSPs, computer hardware/software, or combination of the foregoing; 2) signal analysis methods such as (but not limited to) Fourier analysis, wavelet analysis, etc., implemented via microcontrollers, DSPs, or computer hardware/software; or 3) combinations of the foregoing] from the measured vibration quantifier information. Such vibration feature(s) may include but are not limited to vibration frequency, amplitude, phase, zero-crossings, and local extrema (local minima or maxima). Extracted vibration feature(s) provide(s) information for one or more SDS parameters to be determined through strobe synchronization processing 12 (e.g., by electronic circuits, microcontrollers, DSPs, computer hardware/software, or combination of the foregoing). Using the SPI, strobe signal generator 15 generates a SIM drive signal.

Figure 1C:
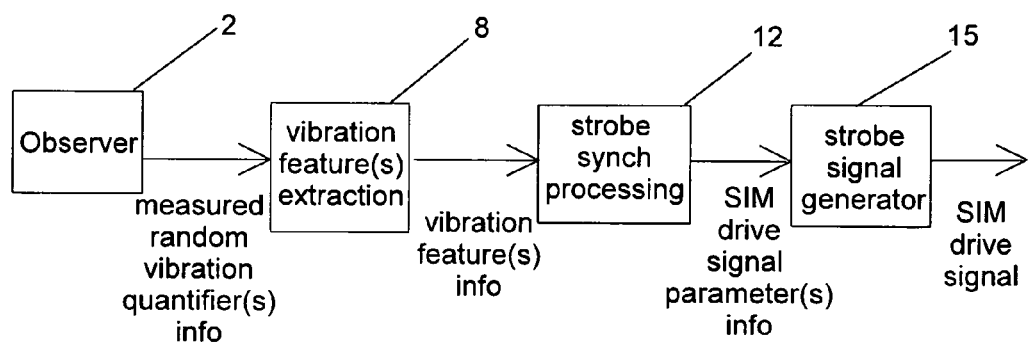

Various aspects of exemplary SIM control system embodiments are described hereunder with reference to FIG. 1C. Referring to FIG. 1C, various embodiments are illustrated where the observer vibration 2 comprises a random vibration and the SDS is derived from real-time measurements of observer vibration quantifier(s). In various embodiments, transducers are used for measurement of observer vibration quantifiers. One or more vibration features are extracted 8 [e.g., by: 1) analog or digital comparators implemented in electronic circuit(s), FPGAs, microcontroller(s), DSPs, computer hardware/software, or combination of the foregoing); 2) signal analysis methods such as (but not limited to) Fourier analysis, wavelet analysis, etc., implemented via microcontrollers, DSPs, or computer hardware/software; or 3) combinations of the foregoing] from the measured vibration quantifier information. Such vibration feature(s) may include but are not limited to vibration frequency, amplitude, phase, zero-crossings, and local extrema (local minima or maxima). Extracted vibration feature(s) enable one or more SDS parameters to be determined through strobe synchronization processing 12 (e.g., by electronic circuits, microcontrollers, DSP, computer hardware/software, or combination of the foregoing) of vibration feature information. Using the SPI, strobe signal generator 15 generates a SIM drive signal.

Figure 1D:
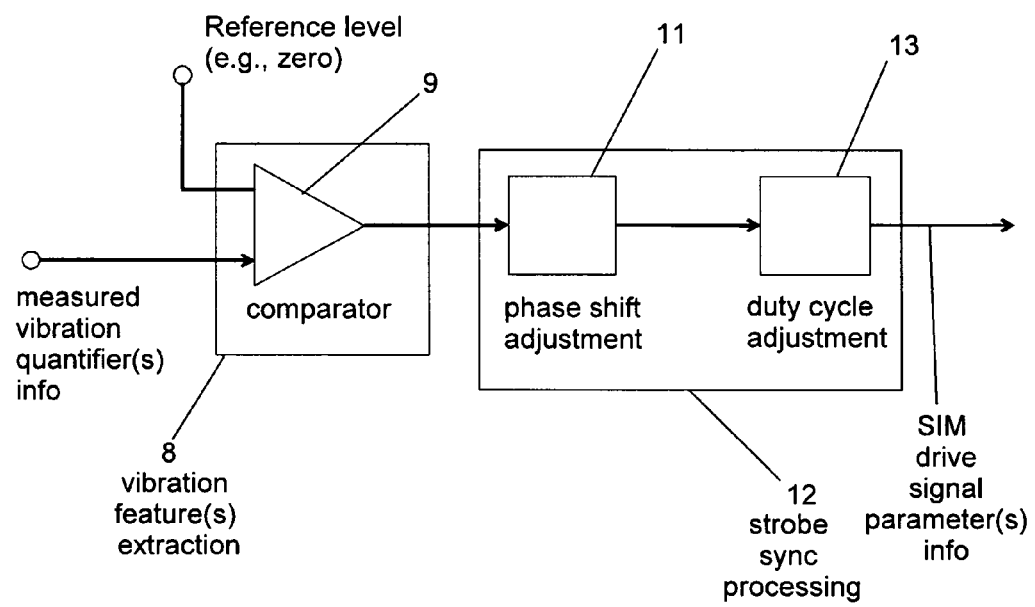

Referring to FIG. 1D, various exemplary embodiments are illustrated with respect to vibration feature(s) extraction. In various embodiments, a measured vibration signal ("vibration quantifier info") from an accelerometer (not shown) is provided to comparator 9. The comparator 9 issues a transition (low-to-high, or vice versa) whenever the measured vibration signal crosses a pre-set threshold (e.g., zero acceleration). In various embodiments, the comparator 9 (such as a 323 high-speed analog comparator IC) indicates a zero-crossing (or other amplitude crossing) of the analog accelerometer output signal. In various embodiments, the comparator 9 (comprising a digital comparator) indicates a zero-crossing (or other amplitude crossing) of the accelerometer output signal that has been converted from analog to digital. Exemplary digital comparators may be (but not limited to): a software programmable filter on FPGA, microcontroller, DSP, or software code on a computer.

Referring to FIG. 1D, various exemplary embodiments are illustrated with respect to vibration feature extraction. In various embodiments, the signal ("vibration quantifier info") provided to comparator 9 is the first derivative with respect to time ("first derivative signal") of the accelerometer output signal. The first derivative signal may be provided by (but not limited to) an analog amplifier differentiation circuit. The first derivative signal may be implemented via (but not limited to) digital filtering of analog-to-digital converted accelerometer output signal. Implementations of the digital filter may include (but not limited to): a) a multi-tap digital circuit; b) a software programmable filter on FPGA, microcontroller, or DSP, or c) software code on a computer. In various embodiments, comparator 9 issues a transition (low-to-high, or vice versa) whenever the first derivative signal crosses zero level. The zero-crossings of the first derivative signal detected by comparator 9 correspond to extrema of the accelerometer output signal. In various embodiments, comparator 9 may be (but not limited to) implemented as an analog comparator circuit. In various embodiments, comparator 9 may be (but not limited to) implemented as a digital comparator acting on a first derivative signal (as provided by (for example): a) output from an analog amplifier differentiation circuit which is then converted from analog to digital, and b) output from digital filtering of analog-to-digital converted accelerometer output signal. Implementations of the digital comparator 9 may include (but not limited to) a software programmable filter on FPGA, microcontroller, or DSP, or software code on a computer.

Referring to FIG. 1D, various exemplary embodiments are illustrated with respect to strobe synchronization processing. In various embodiments, strobe synchronization processing 12 receives high-to-low or low-to-high pulse transition (i.e., step) (digital or analog). Phase shift adjustment 11 may be implemented in a variety of ways, wherein a few exemplary embodiments are herewith disclosed. In various embodiments, the transition (low-to-high or high-to-low) on each cycle of the analog signal pulse can be used to produce a time-delayed pulse using a timer integrated circuit (e.g., a 555, or one-half of a 556 IC) set up in monostable mode. In various embodiments, the amount of time delay is tuned manually by a variable resistor and/or capacitor. In various embodiments, the amount of time delay is obtained with integrated logic circuits (e.g., a 74LS122 IC). In various embodiments, the time delay function is carried out via a programmable delay on an FPGA, microcontroller, DSP, or software code on a computer. In various embodiments, time delay is manipulated up or down in digital implementations via toggle switches. Duty-cycle adjustment 13 may be implemented in a variety of ways, wherein a few exemplary embodiments are herewith disclosed. In various embodiments, the time-delayed pulse from phase shift adjustment 11 drives a second monostable timer integrated circuit (e.g., 555, one-half of 556) that could lengthen or shorten the "on" portion of each cycle. In various embodiments, the "on" duration is set for a fixed "on" time or for a duty cycle percentage of each cycle time (e.g., 74LS123). In various embodiments, duty-cycle adjustment is carried out via a programmable delay on an FPGA, microcontroller, DSP, or software code on a computer. In various embodiments, time delay is manipulated up or down in digital implementations via toggle switches.

Figure 2A:
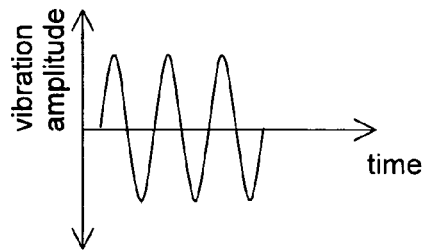
FIGS. 2A-2E illustrate various aspects of embodiments of the present invention with respect to the observer vibration and SIM drive signal.
Figure 2B:
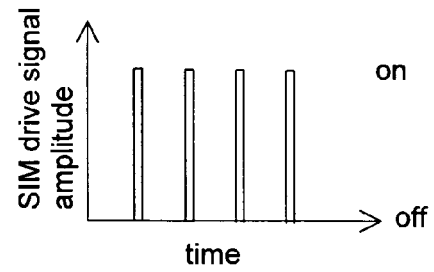
Figure 2C:
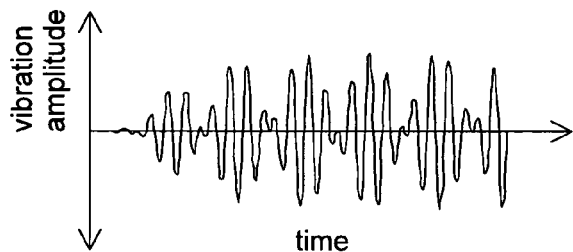
Figure 2D:
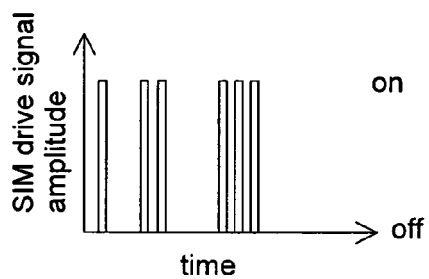
Figure 2E:
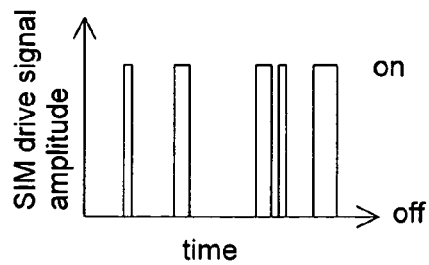

Various aspects of the SIM drive signal and observer vibration are described hereunder with reference to FIGS. 2A-2E. Referring to FIG. 2A, the observer vibration is one in which a dominant primary frequency may be determined. Although the peak amplitudes are shown in the figure as unchanging, it is to be understood that over time the individual cycle amplitudes may increase, decrease, or remain constant. Referring to FIG. 2B, the SIM drive signal constitutes a pulsed signal with two-state logic (on/off), having a duty cycle (amount of time that the signal is on relative to the total cycle period), periodicity, and phase angle (advance/delay) of the SIM drive signal with respect to the observer vibration. In various embodiments, the SIM is not activated unless the absolute value or root mean square (rms) of the amplitude of an observer vibration quantifier is greater than a threshold, the quantifier includes items such as: acceleration, velocity, displacement, and combinations of the foregoing. Referring to FIG. 2C, the observer vibration frequency comprises a complex waveform. In various embodiments, signal processing of the complex (deterministic or random) waveform is used to create the SIM drive signal. Referring to FIG. 2D, a SIM drive signal is characterized by a waveform where the trigger timing of the "on" pulses varies. Referring to FIG. 2E, a SIM drive signal is characterized by a waveform where the time duration of the "on" pulse varies. In various embodiments, the SIM drive signal is characterized by one or more parameters including: a) periodicity (based on frequency derived from the observer vibration); b) variable "on" pulse trigger timing; c) variable "on" pulse time duration, $T_p$; d) periodicity and variable "on" pulse time duration; and e) variable "on" pulse triggering and variable "on" pulse time duration. In various embodiments, the observer vibration is random, and the SIM drive signal is characterized by one or more parameters including: a) variable "on" pulse trigger timing; b) variable "on" pulse time duration $T_p$; and c) variable "on" pulse triggering and variable "on" pulse time duration.

Figure 3:
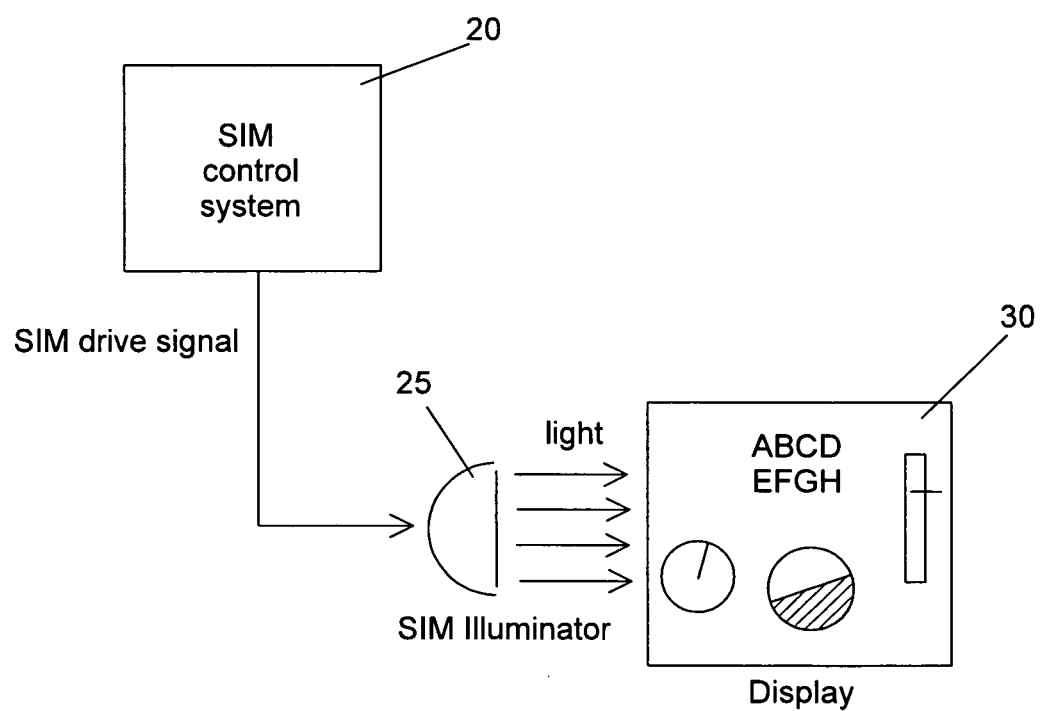
FIG. 3 illustrates various aspects of embodiments of the present invention with respect to a SIM illuminator that stroboscopically modulates the visual image of an object being viewed by the observer.

Various SIM device embodiments are described hereunder with reference to FIG. 3. SIM control system 20 sends a SIM drive signal (SDS) to operate one or more SIM illuminator(s) 25 (shown as a separate apparatus from SIM control system 20) in an alternating on/off temporal pattern according to the SDS. In various embodiments, where SIM control system 20 is incorporated into SIM illuminator 25, SIM control system 20 also can control brightness and/or wavelength. Display 30 may receive light from SIM illuminator(s) 25 from the front, back, or combinations of the foregoing.

Figure 4:
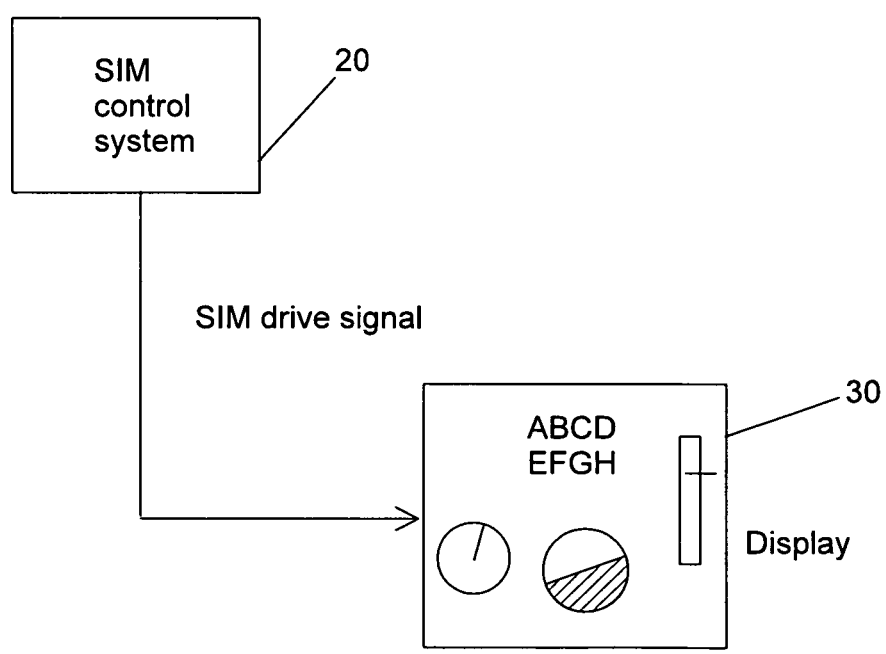
FIG. 4 illustrates various aspects of embodiments of the present invention with respect to a SIM display control system that stroboscopically modulates the visual image of a display being viewed by the observer.

Various SIM device embodiments are described hereunder with reference to FIG. 4. In various embodiments, SIM control system 20 sends a SIM drive signal to operate one or more SIM display(s) 30 (shown as a separate apparatus from SIM control system 20) in an alternating on/off temporal pattern according to the SDS. In various embodiments, where SIM control system 20 is incorporated into SIM display 30, SIM control system 20 can also control brightness and/or color of the image displayed.

Figure 5:
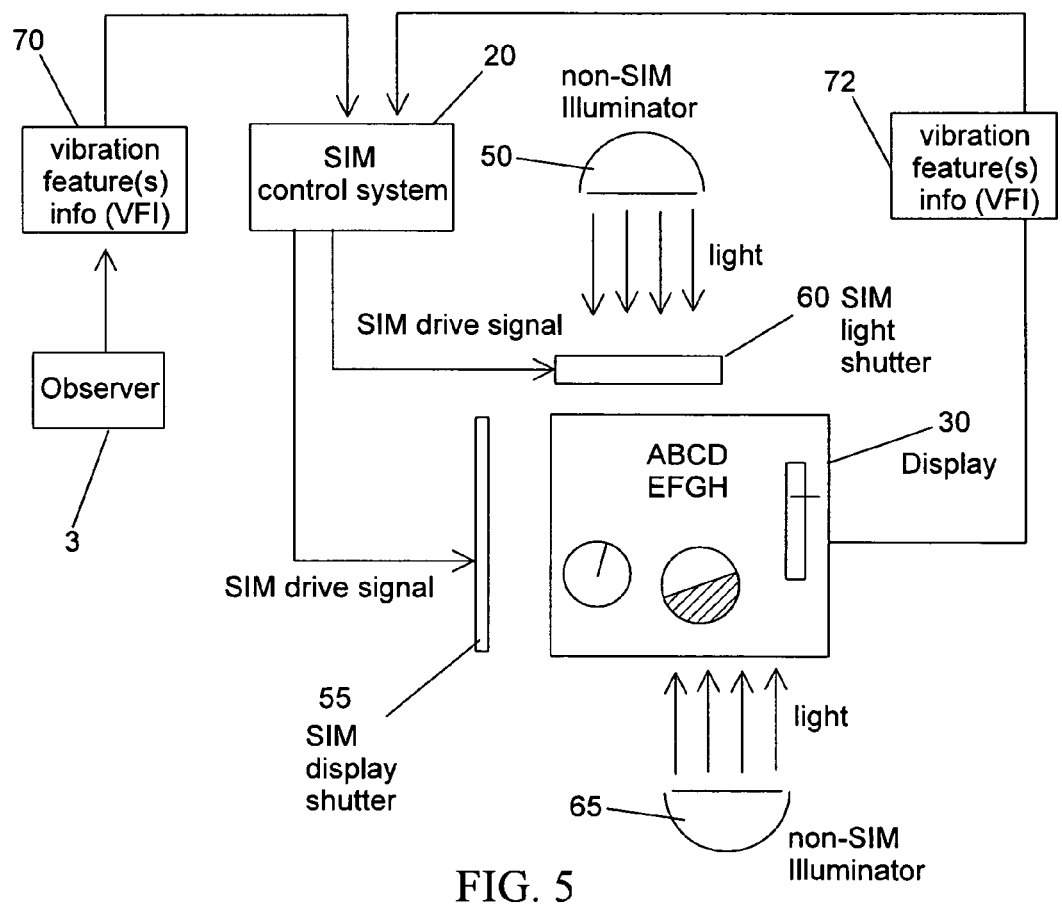
FIG. 5 illustrates various aspects of embodiments of the present invention with respect to use of a SIM drive signal to drive a SIM shutter that stroboscopically modulates the visual image of an object being viewed by the observer.

Various SIM embodiments are described hereunder with reference to FIG. 5. In various embodiments, SIM control system 20 sends a SIM drive signal (SDS) to operate one or more SIM shutter devices in an alternating on/off temporal pattern according to the SDS. In various embodiments, SIM shutter control system 20 sends a SIM drive signal to one or more SIM display shutter(s) 55 interposed between display 30 (receiving light from non-SIM illuminator 65) and the observer 3. In various embodiments, SIM control system 20 sends a SDS drive signal to one or more SIM light shutter(s) 60 interposed between display 30 and non-SIM illuminator 50. In various embodiments, display 30 may receive light from one or more non-SIM illuminator(s) from the front, back, or combinations of the foregoing. As explained above, in various embodiments, observer VFI 70 is determined from VFI that include: i) previously determined VFI (VFI extracted from previously determined VQI; ii) currently determined VFI (VFI extracted from currently determined VQI); and iii) combinations of the foregoing. Previously determined VFI may be available in various forms including but not limited to: a) printed hardcopy; b) stored on computer or electronic medium; c) personal knowledge of the observer or a third party; or d) combinations of the foregoing. In various embodiments, VFI for the viewed object 30 (when the viewed object is experiencing vibration) may be determined in the same manner as described earlier in this paragraph for observer VFI.

With an observer 3 seated in a vibrating chair, the efficacy of stroboscopically image modulating the observer's visual image of a display can be determined. The display is a flat-panel 15-inch-diagonal LCD (1600×1200 pixels, 0.19 mm per pixel resolution) with single edge-mounted LED backlight and full screen diffuser. The display is positioned approximately 51 cm from the observer's eyes, subtending approximately 33 by 25 degree (vertical-by-horizontal) field of view. Strobe circuitry switches the backlight between its full-luminance "on" and completely "off" states according to the duty cycle and phase settings specified. With the backlight in the "on" state, the display has a maximum brightness of 140 cd/m$^2$. The strobe circuitry receives synchronizing trigger inputs from an accelerometer mounted on the vibrating chair. The display is not vibrated, while the observer is. The observer views a display image comprising a six-by-six array of white-frame boxes interconnected by a variety of paths. Each box contains three rows of three digit numbers (10-point font size). One of the boxes is highlighted at random, and the observer is asked to respond "yes" if the digits in the middle row digits of the highlighted box formed a monotonically increasing or decreasing sequence and "no" if it did not. The response accuracy and the reaction time (from the appearance of each new number array) is recorded. A 12-Hz vibration in the x-axis (sternum-to-spine) at a constant 0.7 g amplitude (zero-to-peak), which produces observer head "surge" translation as well as "pitch" rotation, is used. Measurements are taken for conditions of vibration/no-vibration, and strobed/constantly "on" (no strobe) display backlight conditions. The constantly "on" display backlight condition is achieved by strobing the backlight at 100-Hz (a frequency above human detection thresholds for display flicker). Strobe duty cycles (percentage of time that the backlight is illuminated during each vibration cycle) of 5% and 25% are used. Phase angles of 0, 45, 90 and 135 degrees are used. Phase angle is defined as the time from positive-going zero-crossing of the vibration waveform until the center of the strobe's "on" pulse, expressed as a portion of the full 360 degrees of a single vibration cycle. In data collected from 11 observers, error rates for the non-strobed condition increased more than four-fold from 3.5% under no vibration to 16.4% under the 12 Hz vibration. In the non-strobed condition, average response times increased under vibration by 325 ms (from 1.833 seconds under no vibration to 2.159 seconds under vibration). In the non-strobed condition, changing the backlight brightness from 40.5 cd/m$^2$ to 9 cd/m$^2$ slowed response time by 133 ms independent of vibration level. For the non-vibrating condition, strobing the display slowed response time by 103 ms. In the non-vibrating condition, response time was slowed by an additional 83 ms when the display's equivalent luminance was dimmed from 40.5 cd/m$^2$ to 9 cd/m$^2$. For the 12-Hz vibration condition, strobing reduced error rates to 6% for both duty-cycles and all four phase conditions, a level that was statistically indistinguishable from the non-vibrating non-strobed condition. For the 12-Hz vibration condition, response time was 240 ms faster under strobing than for the non-strobed condition. Compared to the non-vibrating non-strobed baseline, strobing (under 12-Hz vibration) slowed response time by 190 ms.

Example 1

During takeoff, a space vehicle's crewmember(s) manually switch(es) on the SIM display system (SIM display control system incorporated into cockpit display) to reduce the visual blur of the cockpit instruments during takeoff. The SIM system had been previously programmed with data for the expected vibration (12 Hz frequency) expected to be experienced by the crewmember(s) during takeoff. During the takeoff, the crewmember(s) manually adjusts the SIM drive signal frequency and duty cycle (pre-set to 25%) to improve clarity of the cockpit display.

Example 2

Similar scenario to example 1, except that the SIM system comprises SIM illuminators that illuminate various cockpit instruments according to the SIM drive signal.

Example 3

Similar scenario to example 1, except that during takeoff, because of unexpected vibration profile, the crewmember(s) switches the SIM system to real-time measurement of the vibration he is experiencing. The system takes measurements of the crewmember(s) vibration (e.g., displacement, velocity, and/or acceleration), and analyzes the waveform to adjust the SIM drive signal for the additional random vibration component due to the unexpected vibration profile.

Example 4

Similar scenario to example 1 except that the SIM system also takes into account vibration experienced by the cockpit instruments in deriving the SIM drive signal.

Example 5

During a routine flight, an airplane experiences a mechanical failure and begins to vibrate severely. The SIM display system (SIM display control system incorporated into the pilot's display[s]) automatically initiates action (vibration zero crossing and/or minimum local extrema onset trigger mechanism thresholds having been reached), generating a SIM drive signal derived from the measured random vibration. After the pilot regains control, she switches off the SIM system.

Example 6

A high-speed patrol boat encounters choppy seas while in pursuit of another craft. The patrol boat's bouncing interaction with the waves produces substantial vibration that would otherwise degrade the crew's ability to read and interpret display panel instruments such as sonar and radar. As in examples 1 and 2, crewmembers manually switch(es) on the SIM display system to reduce the visual blur during high vibration. As in example 3, the system takes measurements of crewmember vibration (e.g., displacement, velocity, and/or acceleration), and analyzes the waveform to adjust the SIM drive signal for the additional random vibration component due to the rough seas. As in example 4, the SIM system also takes into account vibration experienced by the boat's display panel in deriving the SIM drive signal.

Example 7

While driving an off-road vehicle, a driver switches on her SIM system (a global positioning system [GPS] with a $SIM_{dcs}$ built in) in episodic firing mode (using a pre-programmed SDS frequency for the expected road conditions). The $SIM_{dcs}$ continues to stroboscopically modulate the GPS display (alternating on/off temporal pattern according to the internally generated SDS) until the driver switches off the GPS system.

Example 8

Same scenario as example 7 except that the GPS is initially switched on in automatic firing mode. The $SIM_{dcs}$ begins to stroboscopically modulate the GPS display, when measurements at the driver's seat exceed the pre-set SIM onset trigger mechanism.

Example 9

Same scenario as example 8 except that the SIM's internal computer utilizes vibration quantifier measurements at the SIM location and the driver's seat to determine the appropriate SDS frequency.

Example 10

Same scenario as example 9 except that the $SIM_{dcs}$'s internal computer begins to vary the "on" pulse trigger timing and "on" pulse time duration when the random jostling from the terrain causes the internal computer to switch from constant firing mode to episodic firing mode.

Obviously numerous modifications and variations of the present invention are possible in the light of the above teachings. It is therefore to be understood that within the scope of the appended claims the invention may be practiced otherwise than as specifically described therein.

What is claimed is:

1. A method of reducing the visual blur of an object ("viewed object") being viewed by an observer experiencing vibration ("observer vibration"), comprising:
   a) determining information for one or more parameters for a stroboscopic image modulation (SIM) drive signal derived from said observer vibration;
      wherein said one or more parameters for said SIM drive signal (SDS) comprises: frequency ($F_{sds}$), duty cycle ($DC_{sim}$), SIM synchronizing parameter ($SP_{sim}$), "on" time duration ($T_{on}$), SIM onset trigger mechanism ($OTM_{sim}$), SIM shutoff trigger mechanism ($STM_{sim}$), "on" pulse time duration ($T_p$), SIM temporal delay ($TD_{sim}$), or combinations of the foregoing; and
      wherein said determining said SDS parameter information (SPI) comprises:
         i) utilizing previously determined SPI,
         ii) manual entry of SPI by said observer (or a third party), or
         iii) combinations of the foregoing;
   b) generating said SDS using said SPI, wherein said SDS comprises a pulsed signal with two-state logic (on/off), to operate a SIM device in an alternating "on/off" temporal pattern according to said SIM drive signal (SDS); wherein said SIM device comprises:
      i) a SIM illuminator ($SIM_{il}$), wherein, in an "on" state, said $SIM_{il}$ provides light to said viewed object, and in an "off" state, said $SIM_{il}$ does not provide light to said viewed object;
      ii) a SIM object shutter ($SIM_{os}$) (interposed between said observer and said viewed object), wherein, in an "on" state, said $SIM_{os}$ is open, allowing said observer to view said viewed object, and in an "off" state, said $SIM_{os}$ is shut, preventing said observer from viewing said viewed object;
      iii) a SIM light shutter ($SIM_{ls}$) (interposed between said viewed object and a non-SIM illuminator providing light to said viewed object), wherein, in an "on" state, said $SIM_{ls}$ is open, allowing said non-SIM illuminator to provide light to said viewed object; and wherein, in an "off" state, said $SIM_{ls}$ is shut, preventing said non-SIM illuminator from providing light to said viewed object;
      iv) a SIM display ($SIM_{disp}$), comprising said viewed object, wherein, in an "on" state, said $SIM_{disp}$ provides a visual image to said observer, and in an "off" state said $SIM_{disp}$ provides a blank screen (no visual image) to said observer; or
      v) combinations of the foregoing.

2. The method according to claim 1 further comprising:
   a) determining information for one or more observer vibration quantifiers comprising: acceleration, velocity, displacement, Electromyography (EMG), Electrooculography (EOG), and combinations of the foregoing; wherein said observer vibration quantifier information (VQI) comprises:
      i) VQI from estimation algorithms, for an environment similar to the one being experienced or expected to be experienced by said observer,
      ii) VQI from transducer measurements, for an environment similar to the one being experienced or expected to be experienced by said observer, or
      iii) combinations of the foregoing; and
   b) extracting information for one or more observer vibration features from said observer VQI, with said observer vibration feature(s) comprises: frequency, amplitude, phase, zero-crossings, local extrema (local minima or maxima), or combinations of the foregoing;
      wherein said vibration feature information (VFI) extracting comprises: passing said observer VQI through a comparator, utilizing signal analysis to analyze said observer VQI, or combinations of the foregoing;
   and wherein said SPI determining further comprises strobe synchronization processing (SSP) of said observer VFI, said SSP comprising processing said observer VFI with apparatus comprising: electronic circuits, microcontrollers, DSPs, computer hardware/software, or combinations of the foregoing.

3. The method according to claim 2 wherein:
a) said SDS is characterized by SDS parameter, SIM onset trigger mechanism $OTM_{sim}$, $OTM_{sim}$ comprising the trigger mechanism that initiates an individual SDS "on" pulse, and $OTM_{sim}$ comprising:
   i) the absolute value or root mean square ("rms") of the amplitude of an observer vibration quantifier being greater than a specified threshold, wherein said quantifier comprises: acceleration, velocity, displacement, EOG, EMG, or combinations of the foregoing;
   ii) occurrence of zero-crossing(s) in an observer vibration quantifier, wherein said quantifier is selected from the group consisting of: acceleration, velocity, displacement, EOG, EMG, or combinations of the foregoing;
   iii) occurrence of local extrema (local minima or maxima) in an observer vibration quantifier, wherein said observer vibration quantifier comprises: acceleration, velocity, displacement, EOG, EMG, or combinations of the foregoing; or
   iv) combinations of the foregoing; and
b) said SDS is further characterized by a second SDS parameter comprising:
   i) a SIM shutoff trigger mechanism $STM_{sim}$, comprising the trigger mechanism that terminates an individual SDS "on" pulse, and comprising the absolute value or rms of the amplitude of an observer vibration quantifier being less than a specified threshold, with said vibration quantifier being selected from the group consisting of: acceleration, velocity, displacement, EOG, EMG; or combinations of the foregoing;
   ii) an "on" pulse time duration $T_p$, determined by action comprising:
      A) assignment of a value of $T_p$ that is known empirically to reduce visual image blur for the observer vibration (expected or actual),
      B) calculation of the maximum rate of change of an observer vibration quantifier (selected from the group consisting of: displacement, velocity, acceleration, EOG, EMG, and combinations of the foregoing), which, when divided by a specified amount of change of said vibration quantifier, yields a value of $T_p$, or
      C) combinations of the foregoing; or
   iii) combinations of the foregoing.

4. The method according to claim 3 wherein:
$OTM_{sim}$ further comprises a lockout mechanism to prevent noisy measurements (of observer vibration quantifiers) from spurious re-triggering SIM initiation during an SDS "on" pulse period, said lockout mechanism comprising:
   a) a low-pass filter, or
   b) a non-retriggerable flip-flop logic element that prevents the $OTM_{sim}$ from reset for a fixed time duration.

5. The method according to claim 3 wherein:
said SDS is further characterized by one or more SDS parameters comprising:
   a) variable "on" pulse trigger timing,
   b) variable "on" pulse time duration, $T_p$, or
   c) variable "on" pulse triggering and variable "on" pulse time duration, $T_p$.

6. The method according to claim 2 wherein:
said viewed object is also experiencing vibration ("viewed object vibration");
and further comprising:
   a) determining information for one or more viewed object vibration quantifiers comprising: acceleration, velocity, displacement, and combinations of the foregoing; and said viewed object vibration quantifier information (VQI) comprising:
      i) VQI from estimation algorithms, for an environment similar to the one being experienced or expected to be experienced by said viewed object,
      ii) VQI from transducer measurements, for an environment similar to the one being experienced or expected to be experienced by said viewed object, or
      iii) combinations of the foregoing; and
   b) extracting information for one or more viewed object vibration features from said object VQI, with said object vibration feature(s) being selected from the group consisting of: frequency, amplitude, phase, zero-crossings, local extrema (local minima or maxima), and combinations of the foregoing;
      wherein said vibration feature information (VFI) extracting comprises a method selected from the group consisting of: passing said object VQI through a comparator, utilizing signal analysis to analyze said object VQI, and combinations of the foregoing;
and wherein said SSP further comprises using a combination of said observer VFI and said viewed object VFI.

7. The method according to claim 1 wherein:
a) said observer vibration is deterministic and characterized by observer vibration feature, observer frequency, $F_{ov}$, a frequency comprising:
   i) $F_{ovs}$, for vibration characterized by a single sinusoid with frequency $F_{ovs}$, or
   ii) $F_{ovd}$, the frequency of the dominant sinusoidal component in the frequency range of interest, for vibration characterized by a composite of multiple sinusoids; and
b) said SDS is characterized by SDS parameter, SDS frequency $F_{sds}$ determined by a step comprising:
   i) setting $F_{sds}=F_{ov}$,
   ii) setting $F_{sds}=F_{ov}/n$, where n is an integer factor (divisor) of $F_{ov}$,
   iii) setting $F_{sds}$ to a frequency that is within $\pm X$ Hz of $F_{ov}$, wherein $F_{ov}=F_{ovd}$, and X being a range value selected to result in acceptably slow "drift" of the viewed object's image for reduced blur of the visual image perceived by the observer.

8. The method according to claim 7 wherein:
said SDS is further characterized by an SDS parameter comprising:
   a) SIM duty cycle $DC_{sim}$,
   b) SIM synchronizing parameter $SP_{sim}$,
   c) SIM "on" time duration $T_{on}$,
   d) SIM temporal delay $TD_{sim}$, or
   e) combinations of the foregoing.

9. The method according to claim 7 wherein:
a) said viewed object vibration is deterministic and characterized by viewed object vibration feature, frequency $F_{objv}$, a frequency comprising:
   i) $F_{objvs}$, the single frequency characterizing the viewed object vibration (for viewed object vibration that is characterized by a single frequency), and
   ii) $F_{objvd}$, a dominant frequency selected from the frequency range of interest (for viewed object vibration that is a composite of multiple frequencies); and b) said $F_{sds}$ comprising:
  i) the greatest (or other) common factor of $F_{ov}$ and $F_{objv}$, and
  ii) a frequency selected from the group consisting of $F_{ov}$, $F_{objv}$, and a frequency within ±X Hz of either $F_{ov}$ or $F_{objv}$, wherein X is a range value selected to result in acceptably slow "drift" of the viewed object's image for reduced blur of the visual image perceived by the observer.

10. The method according to claim 1 further comprising: controlling the SDS in order to operate said SIM device according to various "enabled" modes comprising:
  a) constant firing mode,
  b) episodic firing mode, or
  c) automatic mode.

11. The method according to claim 1 wherein:
the light (visible spectrum) from said $SIM_{il}$ comprising: a) laser light; b) non-laser light); c) polarized light; d) non-polarized light; or e) lens-focused light.

12. The method according to claim 1 further comprising: controlling the light intensity of said $SIM_{il}$ to compensate for reduced light intensity from said alternating on/off temporal pattern.

13. The method according to claim 1 further comprising: controlling the light intensity of said $SIM_{disp}$ to compensate for reduced light intensity from said alternating on/off temporal pattern.

14. An apparatus to reduce the visual blur of an object ("viewed object") being viewed by an observer experiencing vibration ("observer vibration"), operating in conjunction with a device ("SIM device"), said apparatus comprising:
  a) storage medium (selected from the group consisting of: computer medium, electronic medium, printed hardcopy, and combinations of the foregoing) containing previously determined information for one or more parameters for a stroboscopic image modulation (SIM) drive signal derived from said observer vibration;
    wherein said one or more parameters for said SIM drive signal (SDS) is selected from the group consisting of: frequency ($F_{sds}$), duty cycle ($DC_{sim}$), SIM synchronizing parameter ($SP_{sim}$), "on" time duration ($T_{on}$), SIM onset trigger mechanism ($OTM_{sim}$), SIM shutoff trigger mechanism ($STM_{sim}$), "on" pulse time duration ($T_p$), SIM temporal delay ($TD_{sim}$), and combinations of the foregoing;
  b) apparatus to determine said SDS parameter information (SPI), wherein said SPI determining apparatus is selected from the group consisting of:
    i) computer hardware/software to retrieve said SPI stored on computer medium or electronic medium,
    ii) controls enabling manually entry of said SPI by said observer (or a third party), and
    iii) combinations of the foregoing; and
  c) a strobe signal generator to generate said SDS using said SPI, wherein said SDS comprises a pulsed signal with two-state logic (on/off);
    wherein said SDS may be used to operate said SIM device in an alternating "on/off" temporal pattern according to said SIM drive signal (SDS); and
    wherein said SIM device is selected from the group consisting of:
      i) a SIM illuminator ($SIM_{il}$), wherein, in an "on" state, said $SIM_{il}$ provides light to said viewed object, and in an "off" state, said $SIM_{il}$ does not provide light to said viewed object;
      ii) a SIM object shutter ($SIM_{os}$) (interposed between said observer and said viewed object), wherein, in an "on" state, said $SIM_{os}$ is open, allowing said observer to view said viewed object, and in an "off" state, said $SIM_{ds}$ is shut, preventing said observer from viewing said viewed object;
      iii) a SIM light shutter ($SIM_{ls}$) (interposed between said viewed object and a non-SIM illuminator providing light to said viewed object), wherein, in an "on" state, said $SIM_{ls}$ is open, allowing said non-SIM illuminator to provide light to said viewed object; and wherein, in an "off" state, said $SIM_{ls}$ is shut, preventing said non-SIM illuminator from providing light to said viewed object;
      iv) a SIM display ($SIM_{disp}$), comprising said viewed object, wherein, in an "on" state, said $SIM_{disp}$ provides a visual image to said observer, and in an "off" state, said $SIM_{disp}$ provides a blank screen (no visual image) to said observer; and
      v) combinations of the foregoing.

15. The apparatus according to claim 14 further comprising:
  a) apparatus ("VQI apparatus") to determine information for one or more vibration quantifiers, with said vibration qualifier(s) being selected from the group consisting of: acceleration, velocity, displacement, Electromyography (EMG), Electrooculography (EOG), and combinations of the foregoing;
    wherein said VQI apparatus is selected from the group consisting of
      i) one or more transducers to measure said vibration quantifier information (VQI),
      ii) computer hardware/software equipped to run estimation algorithms to provide said VQI, and
      iii) combinations of the foregoing; and
  b) apparatus ("VFI apparatus") to extract information for one or more vibration features from said VQI, with said vibration feature(s) being selected from the group consisting of: frequency, amplitude, phase, zero-crossings, local extrema (local minima or maxima), and combinations of the foregoing;
    wherein said VFI apparatus is selected from the group consisting of:
      i) comparators implemented as: electronic circuit(s), Field Programmable Gate Array(s) (FPGAs), microcontroller(s), DSPs, computer hardware/software, or combination of the foregoing,
      ii) apparatus selected from the group consisting of: microcontrollers, DSPs, computer hardware/software, and combinations of the foregoing, suitable for signal analysis, and
      iii) combinations of the foregoing;
  and wherein said SPI determining apparatus further comprises strobe synchronization processing (SSP) apparatus to determine said SPI from said VFI, wherein said SSP apparatus is selected from the group consisting of: electronic circuits, microcontrollers, DSPs, computer hardware/software, and combinations of the foregoing.

16. The apparatus according to claim 15 wherein:
  a) said VQI apparatus is used to determine VQI for said observer vibration;
  b) said VFI apparatus is used to determine VFI for said observer vibration; and
  c) said SSP apparatus is used to determine SDS parameter information (SPI) using said observer vibration VFI.

17. The apparatus according to claim 16 wherein:
  a) said SDS is characterized by SDS parameter, SIM onset trigger mechanism $OTM_{sim}$, $OTM_{sim}$ comprising the trigger mechanism that initiates an individual SDS "on" pulse, and OTM$_{sim}$ being selected from the group consisting of:
  i) the absolute value or rms of the amplitude of an observer vibration quantifier being greater than a specified threshold, with said vibration quantifier being selected from the group consisting of: acceleration, velocity, displacement, EOG, EMG, and combinations of the foregoing;
  ii) occurrence of zero-crossing(s) in an observer vibration quantifier, with said vibration quantifier being selected from the group consisting of: acceleration, velocity, displacement, EOG, EMG, and combinations of the foregoing;
  iii) occurrence of observer vibration local extrema (local minima or maxima) in an observer vibration quantifier, with said vibration quantifier being selected from the group consisting of: acceleration, velocity, displacement, EOG, EMG, and combinations of the foregoing; and
  iv) combinations of the foregoing;
b) said SDS is further characterized by a second SDS parameter selected from the group consisting of:
  i) a SIM shutoff trigger mechanism STM$_{sim}$, with STM$_{sim}$ comprising the trigger mechanism that terminates an individual SDS "on" pulse, and STM$_{sim}$ comprising the absolute value or root mean square (rms) of the amplitude of an observer vibration quantifier being less than a specified threshold, wherein the quantifier is selected from the group consisting of: acceleration, velocity, displacement, EOG, EMG, and combinations of the foregoing;
  ii) an "on" pulse time duration T$_p$, with T$_p$ being selected from the group consisting of:
    A) a value of T$_p$ that is known empirically to reduce visual image blur for the observer vibration (expected or actual),
    B) a value of T$_p$ specified from calculation of the maximum rate of change of an observer vibration quantifier (selected from the group consisting of: displacement, velocity, acceleration, EOG, EMG, and combinations of the foregoing) which, when divided by a specified amount of change of said vibration quantifier, yields a value of T$_p$,
    C) combinations of the foregoing; and
  iii) combinations of the foregoing.

18. The apparatus according to claim 17 wherein:
OTM$_{sim}$ further comprises a lockout mechanism to prevent noisy measurements (of observer vibration quantifiers) from spurious re-triggering SIM initiation during an SDS "on" pulse period, said lockout mechanism being selected from the group consisting of:
  a) a low-pass filter, and
  b) a non-retriggerable flip-flop logic element that prevents the OTM$_{sim}$ from reset for a fixed time duration.

19. The apparatus according to claim 17 wherein:
said SDS is further characterized by one or more SDS parameters selected from the group consisting of:
  a) variable "on" pulse trigger timing,
  b) variable "on" pulse time duration T$_p$, and
  c) variable "on" pulse triggering and variable "on" pulse time duration T$_p$.

20. The apparatus according to claim 16 wherein:
a) said viewed object is also experiencing vibration ("viewed object vibration"); and further comprising:
b) one or more transducer(s) to measure VQI for said viewed object;
c) wherein said VQI apparatus is used to determine VQI for said viewed object vibration;
d) wherein said VFI apparatus is used to determine VFI for said viewed object vibration; and
e) wherein said SSP apparatus is used to determined SPI using said observer vibration VFI and said viewed object VFI.

21. The apparatus according to claim 15 further comprising:
apparatus selected from the group consisting of: computer hardware/software, electronic components, or combination of the foregoing, to control the SDS signal in order to operate said SIM device according to various "enabled" modes selected from the group consisting of:
  a) constant firing mode,
  b) episodic firing mode, and
  c) automatic mode.

22. The apparatus according to claim 14 wherein:
a) said observer vibration is deterministic and characterized by observer vibration feature, observer frequency F$_{ov}$, a frequency selected from the group consisting of:
  i) F$_{ovs}$, for vibration characterized by a single sinusoid with frequency F$_{ovs}$, and
  ii) F$_{ovd}$, the frequency of the dominant sinusoidal component in the frequency range of interest, for vibration characterized by a composite of multiple sinusoids; and
b) said SDS is characterized by SDS parameter, SDS frequency F$_{sds}$ selected from the group consisting of:
  i) F$_{ov}$,
  ii) F$_{ov}$/n, where n is an integer factor (divisor) of F$_{ov}$, and
  iii) a frequency that is within ±X Hz of F$_{ov}$, wherein F$_{ov}$=F$_{ovd}$, and wherein X is a range value selected to result in acceptably slow "drift" of the viewed object's image for reduced blur of the visual image perceived by the observer.

23. The apparatus according to claim 22 wherein:
said SDS is further characterized by an SDS parameter selected from the group consisting of:
  a) SIM duty cycle DC$_{sim}$,
  b) SIM synchronizing parameter SP$_{sim}$,
  c) SIM "on" time duration T$_{on}$,
  d) SIM temporal delay TD$_{sim}$, and
  e) combinations of the foregoing.

24. The apparatus according to claim 22 wherein:
a) said viewed object vibration is deterministic and characterized by viewed object vibration feature, frequency F$_{objv}$, a frequency selected from the group consisting of:
  i) F$_{objvs}$, the single frequency characterizing the viewed object vibration (for viewed object vibration that is characterized by a single frequency), and
  ii) F$_{objvd}$, a dominant frequency selected from the frequency range of interest (for viewed object vibration that is a composite of multiple frequencies); and
b) said F$_{sds}$ is selected from the group consisting of:
  i) the greatest (or other) common factor of F$_{ov}$ and F$_{objv}$, and
  ii) a frequency selected from the group consisting of F$_{ov}$, F$_{objv}$, and a frequency within ±X Hz of either F$_{ov}$ or F$_{objv}$, wherein X is a range value selected to result in acceptably slow "drift" of the viewed object's image for reduced blur of the visual image perceived by the observer.

25. An apparatus to reduce the visual blur of an object ("viewed object") being viewed by an observer experiencing vibration ("observer vibration"), comprising:

a) storage medium (selected from the group consisting of: computer medium, electronic medium, printed hardcopy, and combinations of the foregoing) containing previously determined information for one or more parameters for a stroboscopic image modulation (SIM) drive signal derived from said observer vibration;

wherein said one or more parameters for said SIM drive signal (SDS) is selected from the group consisting of: frequency ($F_{sds}$), duty cycle ($DC_{sim}$), SIM synchronizing parameter ($SP_{sim}$), "on" time duration ($T_{on}$), SIM onset trigger mechanism ($OTM_{sim}$), SIM shutoff trigger mechanism ($STM_{sim}$), "on" pulse time duration ($T_p$), SIM temporal delay ($TD_{sim}$), and combinations of the foregoing;

b) apparatus to determine said SDS parameter information (SPI), wherein said SPI determining apparatus is selected from the group consisting of:
 i) computer hardware/software to retrieve said SPI stored on computer medium or electronic medium,
 ii) controls enabling manual entry of said SPI by said observer (or a third party), and
 iii) combinations of the foregoing;

c) a strobe signal generator to generate said SDS using said SPI, wherein said SDS comprises a pulsed signal with two-state logic (on/off); and d) a SIM device that receives said SDS, said SDS causing said SIM device to operate in an alternating "on/off" temporal pattern according to said SIM drive signal (SDS);

wherein said SIM device is selected from the group consisting of:
 i) a SIM illuminator ($SIM_{il}$), wherein, in an "on" state, said $SIM_{il}$ provides light to said viewed object, and in an "off" state, said $SIM_{il}$ does not provide light to said viewed object;
 ii) a SIM object shutter ($SIM_{os}$) (interposed between said observer and said viewed object), wherein, in an "on" state, said $SIM_{os}$ is open, allowing said observer to view said viewed object, and in an "off" state, said $SIM_{ds}$ is shut, preventing said observer from viewing said viewed object;
 iii) a SIM light shutter ($SIM_{ls}$) (interposed between said viewed object and a non-SIM illuminator providing light to said viewed object), wherein, in an "on" state, said $SIM_{ls}$ is open, allowing said non-SIM illuminator to provide light to said viewed object; and wherein, in an "off" state, said $SIM_{ls}$ is shut, preventing said non-SIM illuminator from providing light to said viewed object;
 iv) a SIM display ($SIM_{disp}$), comprising said viewed object, wherein in an "on" state said $SIM_{disp}$ provides a visual image to said observer, and in an "off" state, said $SIM_{disp}$ provides a blank screen (no visual image) to said observer; and
 v) combinations of the foregoing.

26. The apparatus according to claim 25 further comprising:

a) apparatus ("VQI apparatus") to determine information for one or more vibration quantifiers, with said qualifier(s) being selected from the group consisting of: acceleration, velocity, displacement, Electromyography (EMG), Electrooculography (EOG), and combinations of the foregoing;

said VQI apparatus being selected from the group consisting of
 i) one or more transducers to measure said VQI,
 ii) computer hardware/software equipped to run estimation algorithms to provide said VQI, and
 iii) combinations of the foregoing; and further comprising: and b) apparatus ("VFI apparatus") to extract information for one or more vibration features from said VQI, with said feature(s) being selected from the group consisting of: frequency, amplitude, phase, zero-crossings, local extrema (local minima or maxima), and combinations of the foregoing;

said VFI apparatus being selected from the group consisting of:
 i) comparators implemented as: electronic circuit(s), Field Programmable Gate Array(s) (FPGAs), microcontroller(s), DSPs, computer hardware/software, or combination of the foregoing;
 ii) apparatus selected from the group consisting of: microcontrollers, DSPs, computer hardware/software, and combinations of the foregoing, suitable for signal analysis; and
 iii) combinations of the foregoing;

and wherein said SPI determining apparatus further comprises strobe synchronization processing (SSP) apparatus to determine said SPI from said VFI, with said SSP apparatus being selected from the group consisting of: electronic circuits, microcontrollers, DSPs, computer hardware/software, and combinations of the foregoing.

27. The apparatus according to claim 25 wherein:
a) said viewed object is a display,
b) said $SIM_{il}$ provides light to a surface of said display, said display surface being selected from the group consisting of:
 i) the front of said display, and wherein said display is selected from the group consisting of: mechanical displays, printed text/graphics displays, electromechanical displays, electronic paper displays, and combinations of the foregoing, and
 ii) the back of said display, and wherein said display is selected from the group consisting of mechanical gauges/dials, LCD displays, and combinations of the foregoing.

28. The apparatus according to claim 25 wherein:
a) said $SIM_{os}$ is selected from the group consisting of: mechanical shutters, chemical shutters (e.g., photochromic), electro-optical shutters (e.g., electrochromic), liquid crystal display (LCD) based shutters, mirror-based shutters, polarizers, and combinations of the foregoing; and
b) said viewed object comprises a display selected from the group consisting of: electromechanical displays, electronic displays (including but not limited to LCD displays, LED displays [including OLED displays], plasma displays, CRT displays, electroluminescent displays, electronic paper displays), and combinations of the foregoing.

29. The apparatus according to claim 25 wherein:
a) said viewed object is a display;
b) said $SIM_{ls}$ is selected from the group consisting of: mechanical shutters, chemical shutters (e.g., photochromic), electro-optical shutters (e.g., electrochromic), liquid crystal display (LCD) based shutters, mirror-based shutters, polarizers, and combinations of the foregoing; and c) said non-SIM illuminator provides light to a surface of said display, said display surface being selected from the group consisting of:
   i) the front of said display, wherein said display is selected from the group consisting of: mechanical displays, printed text/graphics displays, electromechanical displays, electronic displays, and combinations of the foregoing; and
   ii) the back of said display, wherein said display is an LCD display.

30. The apparatus according to claim 25 wherein:
said portion of said display controlled by said $SIM_{disp}$ is selected from the group consisting of: electromechanical displays, electronic displays (including but not limited to LCD displays, LED displays (including OLED displays), plasma displays, CRT displays, electroluminescent displays, electronic paper displays), and combinations of the foregoing.

31. The apparatus according to claim 25 wherein:
the light (visible spectrum) from said $SIM_{il}$ is selected from the group consisting of: a) laser light; b) non-laser light); c) polarized light; d) non-polarized light; and e) lens-focused light.

32. The apparatus according to claim 25 wherein:
said $SIM_{il}$ is capable of controlling its light intensity to compensate for reduced light intensity from said on/off temporal pattern.

33. The apparatus according to claim 25 further comprising:
said $SIM_{disp}$ is capable of controlling the light intensity of said display to compensate for reduced light intensity from said on/off temporal pattern.

* * * * *